United States Patent [19]
Leenhouts

[11] 4,319,175
[45] Mar. 9, 1982

[54] STABILIZED STEPPING-MOTOR SYSTEM
[75] Inventor: Albert C. Leenhouts, Harwinton, Conn.
[73] Assignee: The Superior Electric Company, Bristol, Conn.
[21] Appl. No.: 157,025
[22] Filed: Jun. 6, 1980
[51] Int. Cl.³ ............................................. G05B 19/40
[52] U.S. Cl. .................................................. 318/696
[58] Field of Search ............... 318/696, 685, 138, 254
[56] References Cited
U.S. PATENT DOCUMENTS
3,684,934  8/1972  Loyzim ................................ 318/696
3,967,179  6/1976  Loyzim ................................ 318/696
4,025,859 12/1975  Smith .................................. 318/696

Primary Examiner—B. Dobeck

[57] ABSTRACT

In the disclosed electro-mechanical system of a stepping motor and its control circuit, positive electrical damping is provided for avoiding loss of synchronism and loss of torque over the range of intermediate and high stepping frequencies by imposing a self-adjusting limit on the motor current over a period of time longer than any prominent period of parametric oscillation of the system and supplying current to the motor with a d-c supply having high impedance.

14 Claims, 5 Drawing Figures

STABILIZED STEPPING-MOTOR SYSTEM

The present invention relates to stepping motors and their drive circuits.

BACKGROUND

Stepping motors such as that in U.S. Pat. No. 2,931,929, assigned to the assignee of the present invention, are operated by a pulse-to-step motor control circuit. Upon each change of energization of the windings, the motor advances a step. Sustained energization of at least one phase winding is necessary at stand-still to maintain torque.

Due to their inductance, the windings of a stepping motor tend to draw maximum current at stand-still and at low stepping rates, and declining current at increasing speeds. The current supplied to the windings from a high voltage d-c supply can be chopped in control circuits that act, generally, to maintain a desired current level in the windings over a wide range of stepping frequencies, thus improving efficiency and avoiding overheating.

Stepping motors are subject to loss of synchronism at various stepping rates in the broad range of motor speeds, involving loss of torque and the possibility of stalling. This loss of synchronism has been identified with resonances of different types. One type of oscillation occurs at a definite natural resonance frequency of less than 200 steps/sec. for most stepping motors and at sub-harmonics of the natural resonance frequency. There is a discrete integral relationship between the stepping frequency and these resonances which occur at low stepping frequencies. In most practical situations these resonances do not critically limit the performance of a stepping motor system since most motor-and-load combinations can be started instantly at stepping rates well above their natural resonance frequencies. The present invention is not concerned with those low-frequency resonances.

The phenomenon of "mid-frequency resonance" or "mid-range resonance" occurs at a band of stepping rates that are often of prime importance in the motor's application. The motor, its drive and its load tend to lapse into parametric oscillation, which has no integral or rational relationship to the stepping frequency. Instability due to parametric oscillation also tends to develop at bands of higher stepping frequencies. At each such resonance band, the torque may drop seriously and the motor may stall. If the motor is intended to operate in a range of stepping frequencies above a band of instability, some type of acceleration scheme is necessary to drive the motor quickly through such a band of stepping frequencies.

An active stabilizer in U.S. Pat. No. 4,081,736 (assigned to the assignee hereof) counteracts the tendency of a motor and its drive to oscillate. There is still a marked decline of torque in the mid-frequency resonance range. While the active stabilizer in that patent is disclosed in a non-chopping drive, it is also effective in drives of the type in U.S. Pat. No. 4,127,801 that include chopping.

Another useful technique for reducing mid-frequency instability is described in U.S. Pat. No. 3,684,934, assigned to the assignee hereof. In that patent, a small capacitor and diodes are used to draw off and store fly-back or discharge energy of the windings when energizing current is switched off, and a choke allows slow return of the stored energy to the power supply. The circuit is partially effective in avoiding torque reduction due to instability. Unfortunately, that technique does not lend itself readily for use with chopping type drives.

Stepping motors are subject to the further problem of oscillation being triggered both when a new rotational speed is to commence abruptly and when an abrupt change of load occurs. The motor speed hunts above and below the desired speed, gradually settling down to a more-or-less constant speed. The problem of oscillation induced by such abrupt changes has been met in special cases by fluid damping and to some extent by special drive circuits and judicious control over pulse timing. There seems to have been no recognition that positive damping is needed in motor drive circuits to cause rapid settling-down of the motor speed when an abrupt change of speed or load occurs, nor has there been any broad-spectrum solution to the problem of oscillations occurring at intermediate and high motor speeds.

SUMMARY OF THE INVENTION

An object of the present invention resides in providing a novel method and means for developing positive damping in the drive of a stepping motor that is effective over the broad spectrum of speeds above the natural resonance speed range rather than just eliminating "holes" in the speed-torque curve. A demonstration of such damping is in the decay time of velocity modulations that occur when a sudden change of velocity is imposed on the motor.

Another object of the invention resides in providing a novel method and means for developing positive damping in the drive circuit of a stepping motor that largely avoids loss of torque due to parametric oscillation that occurs (unless suppressed) in the important mid-frequency range and in high-frequency bands.

A further object of the invention resides in rendering a stepping motor and its drive circuit less sensitive to minor variations of parameters in stepping motor systems, to differences between motors, to disturbances in the pulse train, and to changes in load, friction and inertia.

Achievement of these objects makes possible a generally more "forgiving" drive, a drive that can be controlled from a simpler, less accurate control algorithm which in turn can be implemented in a less costly microprocessor.

Pursuant to one of the novel features of the invention, broadly stated, the usual d-c supply for a stepping motor is modified to incorporate high output impedance. During a period of oscillation, there is an interaction between the power supply and the motor, involving heavy power drain by the motor and, alternately, return of energy to the power supply. The high impedance between the d-c supply and the motor restrains this back-and-forth shift of energy and in this way, it inhibits oscillation. A conventional d-c supply of this kind may include a rectifier and a large shunt filter capacitor. In the illustrative embodiments of the invention described in detail below, high impedance is imparted by interposing a series choke and a shunt capacitor (much smaller than usual filter capacitors) between the motor windings and the output of the d-c supply.

Pursuant to a second novel feature, broadly stated, a time-varying representation of the motor current is developed over a substantially longer time interval than the period of the lowest frequency of oscillation to be damped, and that representation of the motor current is used in a current clamp. That current representation is allowed to vary, so that the current clamp "floats" or is self-adjusting to the needs of the motor.

In one embodiment of this aspect of the invention, a floating current clamp is provided in series with each phase winding by a respective choke or inductor shunted by a rectifier such as a diode polarized to sustain circulation of current in the choke-and-diode loop. The initial value of current is close to that which prevailed when the current of the winding was switched off. When current to the winding is again switched on, the impedance of the choke remains insignificant and the rise of current is determined essentially by the impedance of only the motor winding until the level of the circulating current is reached. Increase of the current above that level is limited abruptly because the choke's inductance becomes fully effective, causing the circuit impedance to rise by an order of magnitude. The rate-of-change of this current-limitation effect over a series of steps of the motor is determined by the ratio L/R of the choke's reactance to the combined resistance of the choke and the rectifier. The time constant of a choke of suitable reactance and current-carrying capacity and its shunt rectifier normally will greatly exceed the longest period of parametric resonance of most stepping motors. This embodiment uses passive components, and it is simple and reliable. Its disadvantages are the large size and weight of the chokes, and their substantial cost.

In a second illustrative embodiment of the second feature of the invention, a self-adjusting current clamp is used as a reference together with a current sensor to limit the phase currents to maxima that are allowed to vary more slowly than the period of the lowest-frequency oscillation to be damped. The self-adjusting current reference is derived from the sensed current, and it is stored and used to limit the peak motor current. The rise and decay of the floating or self-adjusting current reference signal occur too slowly to support parametric oscillation.

Both in the example of the choke and its circulating-current rectifier and in the example of a current sensing circuit in which a representation of the current is stored, the current-clamp circuit has a longer time constant than the longest period of motor oscillation that is to be suppressed, thus acting to impose positive damping that inhibits parametric oscillations.

A chopping power supply for bifilar stepping motors is described in my copending U.S. patent application Ser. No. 909,590 filed May 25, 1978, now U.S. Pat. No. 4,208,623 in which the peak value of current pulses supplied to the motor is limited at a set value. Such choppers can be adapted for present purposes by simple but highly effective change.

A stepping motor and driver of the bifilar type is included in the two illustrative embodiments of various aspects of the invention described in detail below and shown in the accompanying drawings. However, it should be understood that the novel features of the invention are also applicable to bipolar motors and drives, and to drives that many include or omit choppers.

The nature of the invention, including the foregoing novel features and advantages will be more fully appreciated, and other novel features will be apparent, from a review of the following detailed description of two illustrative embodiments that are shown in the accompanying drawings.

THE ILLUSTRATIVE EMBODIMENTS

Figure 2:
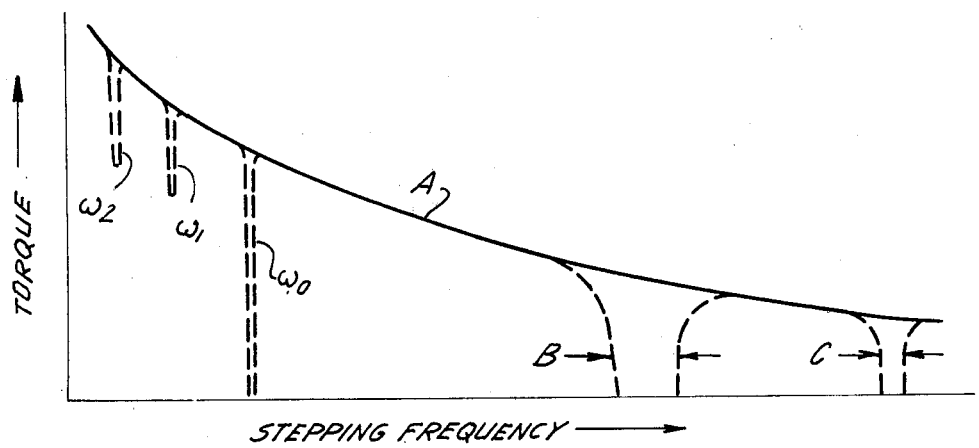
FIG. 2 is a curve, not to scale, of stepping motor performance over a wide range of stepping frequencies, including dotted lines representing regions of instability.

Referring now to the drawings, FIG. 2 solid line A is a generalized curve of torque v. frequency theoretically attainable with typical stepping motors. The broken-line portion $\omega_0$ represents the loss of torque that tends to occur at the natural resonant frequency of the system including the motor, its drive and its load. This resonance occurs below 200 steps/sec. for most motors, for example at 60, 77 or 100 steps/sec. Broken-line portions $\omega_1$ and $\omega_2$ represent the decrease of torque that tends to occur at sub-harmonics of the natural resonant frequency. Such resonance is identified with the stepping frequency.

Broken-line portion B represents a band of stepping frequencies at which so-called "mid-range resonance" or "mid-frequency resonance" occurs. This band may extend from about 1800 to 3400 steps/sec., for example. Parametric oscillation develops, having no rational integral relationship to the stepping frequencies. Parametric oscillation may also develop at one or more higher stepping frequency bands, represented in FIG. 2 by the broken-line curve C.

Figure 1:
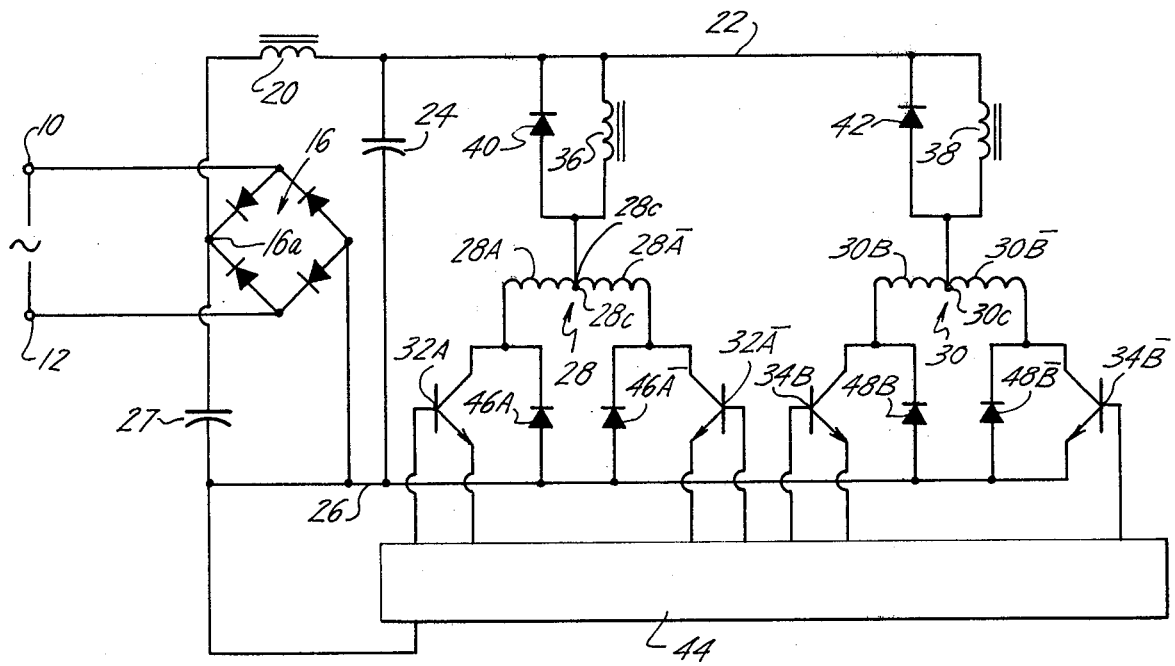
FIG. 1 is a wiring diagram of a stepping motor and its drive circuit as an illustrative embodiment of a number of features of the invention.

In FIG. 1, alternating current (as from an alternating-current line or the output of a step-down transformer energized at 60 Hz) is supplied to input terminals 10, 12.

Inductor 20 is interposed between a d-c terminal 16a of bridge rectifier 16 and line 22, while capacitor 24 is connected between d-c motor-energizing lines 22 and 26 at the load side of inductor 20. An optional filter capacitor 27 is connected across the d-c terminals of the bridge rectifier.

Phase windings 28 and 30 represent four series-connected groups of coils forming four windings A, $\overline{A}$, B, $\overline{B}$ of a two-phase permanent-magnet stepping motor having bifilar windings. Each bifilar winding of phase A includes portions 28A and 28$\overline{A}$ connected at centertap 28c, and each phase B includes portions 30B and 30$\overline{B}$ connected at centertap 30c. Switching transistors 32A and 32$\overline{A}$ are operable separately to connect windings 28A and 28$\overline{A}$ to d-c supply line 26, while switching transistors 34B and 34$\overline{B}$ are operable separately to connect terminals of windings 30B and 38$\overline{B}$ to d-c supply line 26. Inductors or chokes 36 and 38 connect the centertaps 28c and 30c of the two phase windings to line 22. Diode rectifiers 40 and 42 shunt inductors 36 and 38, respectively. These rectifiers are polarized to sustain current circulating in the inductors when a transistor is switched "off", and do not conduct current from d-c line 22. The same operation occurs in inductor 38 and rectifier 42.

When switch $\overline{32A}$ is "closed", switch 32A is—or should be—"open". With switch 32A closed, current flows from line 22 through inductor 36, winding 28A, transistor 32A, and circuit 44 to line 26. The bases of switching transistors 32A, $32\overline{A}$, 34B and $34\overline{B}$ are connected to control circuit 44, which causes sequential energization of the windings for stepwise advance of the motor, for example AB, $\overline{A}$B, $\overline{A}\overline{B}$, $A\overline{B}$, AB, etc.

Control circuit 44 in this embodiment is like that in my copending application Ser. No. 909,590 filed May 25, 1978, where the control circuit introduces chopping of the current at a high rate, nominally 20 kHz, in addition to sequential switching of the phases.

Windings A and $\overline{A}$ each consists of a plurality of serially connected coils. Each winding has a coil on the same pole of the motor as the other winding so that the coils on the same core and hence the windings are inductively related. The coils on each pole have the same number of turns. The energization of a winding by the d-c supply by closure of its switching transistor produces magnetic flux in the poles. The coils of windings A and $\overline{A}$ (and those of windings B and $\overline{B}$) are so connected for energization by the d-c supply that the A coil and the $\overline{A}$ coil on a common pole develop opposite magnetic polarities. When the energization of one winding of a phase is interrupted by opening of a switching transistor, current is induced in the other winding of that phase, flowing in the direction which causes the other winding to produce the same magnetization of the pole as that produced by the power supply energized winding. Thus, magnetization of the pole is sustained briefly by induced current. For example, when switching transistor 32A opens the circuit of winding 28A, induced current flows from line 26 through diode $46\overline{A}$, winding $28\overline{A}$, and diode 40, building up the charge in capacitor 24.

When switching transistor 32A (for example) interrupts energizing current in phase winding 28A, the magnetic field of its series choke or inductor 36 tends to collapse. The resulting induced voltage in the choke causes current to circulate through the choke and its shunt rectifier 40. That current, in turn, retards the collapse of its magnetic field. Consequently, when transistor 32A is next switched "on", the rise of current in phase winding 28A is unimpeded by choke 36 until the level of its circulating current is reached. At that point, diode 40 becomes back-biased, and choke 36 abruptly becomes effective as an impedance in series with motor winding 28A. Parts 36 and 40 form a current clamp. In an example, choke 36 and a winding 28 typically have inductances of 30 mH and $\frac{1}{2}$ to 2 mH, respectively. Any tendency of the motor to draw the increased current needed to sustain oscillation is severely limited by choke 36. The choke and its shunt diode are thus highly effective in introducing positive damping. They should be proportioned (within practical limits) to avoid loss of torque due to incipient oscillation.

The level of current that the motor draws is a variable, being a function of load on the motor, stepping frequency, and other factors. The level of circulating current in the choke-diode loop varies accordingly. Hence this loop constitutes a floating current clamp. As a clamp, the device "floats" or adjusts itself to changing motor conditions at a rate limited by its L/R ratio.

The frequency of parametric oscillations typically is about 50 to 200 Hz, with corresponding periods of 20 to 5 ms. The ratio L/R of the choke/diode loop 36, 40 is 30 mH/0.2 ohms, for example, yielding a time constant of 150 ms. With these values, the rate of decay of the current-limiting level of floating current clamp 36, 40 is much slower than would be needed to sustain parametric oscillation with its alternating half-cycles of (a) drain of current from the power supply, and (b) return of current to the power supply. The rate of rise of the clamping current level is limited to a large degree by the large impedances of chokes 36 and 38. For these effects the time constant of the current clamp should be significantly longer than the period of the slowest parametric oscillation to be suppressed. Also, the inductance of choke 36 (40) should be of the order of 3 to 10 times greater than that of its series connected and energized phase winding.

Inductor or choke 20 represents a series component between terminal 16a of bridge rectifier 16 and common connection 22 of the phase-winding circuits. The current is interrupted when the switching transistors are turned "off", which occurs in the course of sequencing of the phases for stepping. At the instant of current interruption, choke 20 has significant energy stored in its magnetic field due to the current that had been flowing. This energy $\frac{1}{2}Li^2$ is available to charge capacitor 24 quickly. The choke also acts as part of a ripple filter, thus reducing the amount of filter capacitance otherwise needed if this choke were not used.

Under conditions of hard deceleration, or a sudden loss of the pulse train, high peak currents can still occur in the phase windings. Whenever motor windings are driven from a capacitive type supply, for example that in U.S. Pat. No. 3,809,991, peak currents can also occur during the switching of the phases. This is due to the fact that the turn-on time of a switch tends to be shorter than the turn-off time of its counterpart. During the brief interval that both switches of one phase are conducting, the only element that limits the current is the leakage inductance of the motor. For example, with a 40 V supply voltage, a switching overlap time of 5 $\mu$s and a leakage inductance of 20 $\mu$H, 10A peak currents can occur. These currents build up and decay very fast, and can cause RFI and reliability problems.

Experience and analysis show that even when these brief current spikes are eliminated by the insertion of delay circuits, in drives of the capacitive type peak currents still occur that are quite significant, e.g. three times the average stand-still currents. Chokes 36 and 38 and choke 20 suppress these peaks.

It was noted above that energy is transferred back and forth between the power supply and the motor while parametric oscillation occurs. Series choke 20 and shunt capacitor 24 are excited primarily at the oscillation frequency whereas the motor windings are excited at the far higher stepping frequency.

Figure 4:
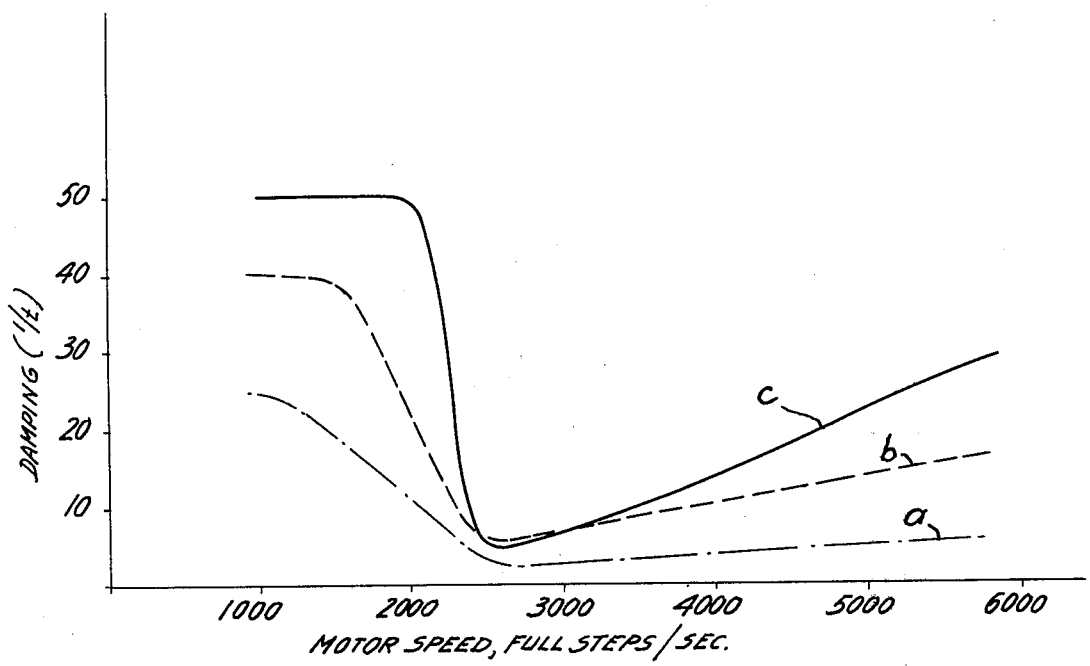
FIGS. 4 and 5 are graphs of positive damping achieved using features of the apparatus in FIG. 1.
Figure 5:
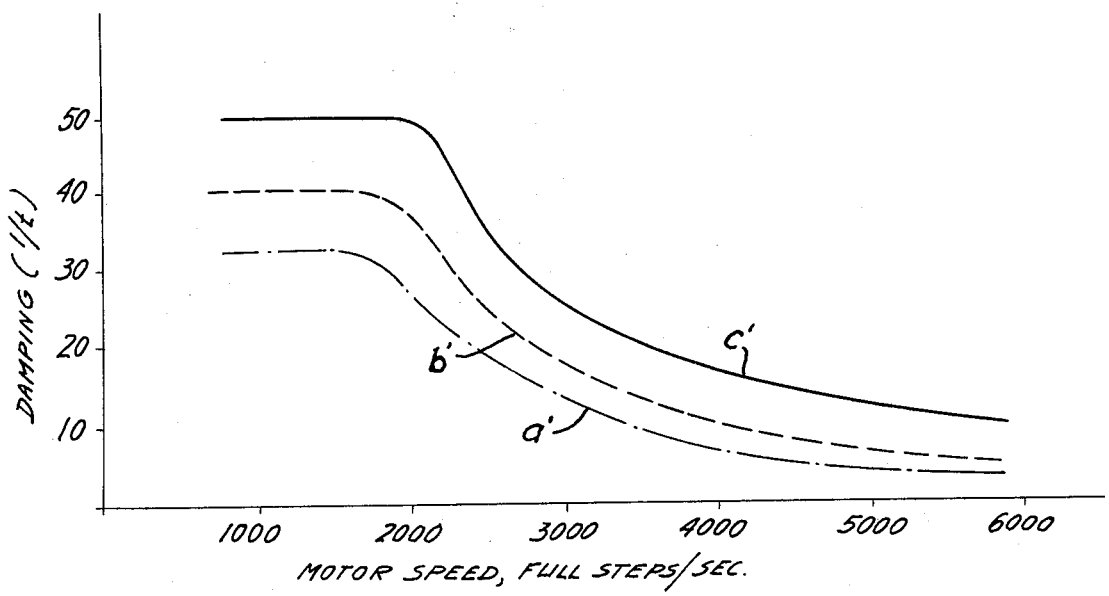

FIGS. 4 and 5 demonstrate the effectiveness of damping provided by L/C circuit 20, 24 separately and with the current clamps 36, 40 and 38, 42. FIG. 4 represents system operation omitting the current clamps, and FIG. 5 represents system operation including those current clamps. A bifilar stepping motor MO 93-FC11E was used with a TC 200 drive as in my U.S. Pat. No. 4,208,623 having a power supply rated at 50 Volts d-c and 5 Amps. per phase, both the motor and drive being products of The Superior Electric Company, Bristol, Conn. Abrupt changes in stepping frequency were introduced, which induced intervals of decaying parametric oscillation. The inverse of the decay times of those oscillations were plotted against stepping frequency. Curves a and a′, b and b′, and c and c′ represent system performance where capacitor 24 had values of 1500 Mfd., 600 Mfd. and 300 Mfd., respectively. Choke 20 has an inductance of 30 mH.

High output impedance of the d-c supply imparted by the choke-capacitor circuit 20, 24 had the general effect of increased broad-band damping at low speeds (up to 2000 steps/sec. in this case) and a general increase in damping at high speeds (3000 steps/sec. and up). In previous tests it has been shown that with very large values of the output capacitor, damping can go to a negative value at speeds of around 2500 steps per second, causing loss of torque. FIG. 4 shows at least the elimination of negative damping at mid-frequency. When chokes 36 and 38 and their diodes are included in the circuit of FIG. 1, the dip in the damping curves occurring at midrange of FIG. 4 is eliminated as shown by FIG. 5. Stepping motor systems are often required to produce a maximum amount of shaft output power at the frequencies where instability is most likely to occur, somehwere between 2000 and 3000 steps per second in this case. The inclusion of the floating current clamps 36, 40 and 38, 42 thus provides highly effective positive damping in the mid-range band of stepping frequencies. The floating current clamps complement the high-impedance represented by choke 20 and capacitor 24. The curves of FIG. 5 demonstrate broad-spectrum positive damping. Improvement in damping was realized as the value of capacitor 24 was decreased from 1500 Mfd. to 300 Mfd. Reduction in capacitance below 3000 Mfd. did not result in further increase in damping, so that 300 Mfd. represents a fairly flat optimum value.

Figure 3:
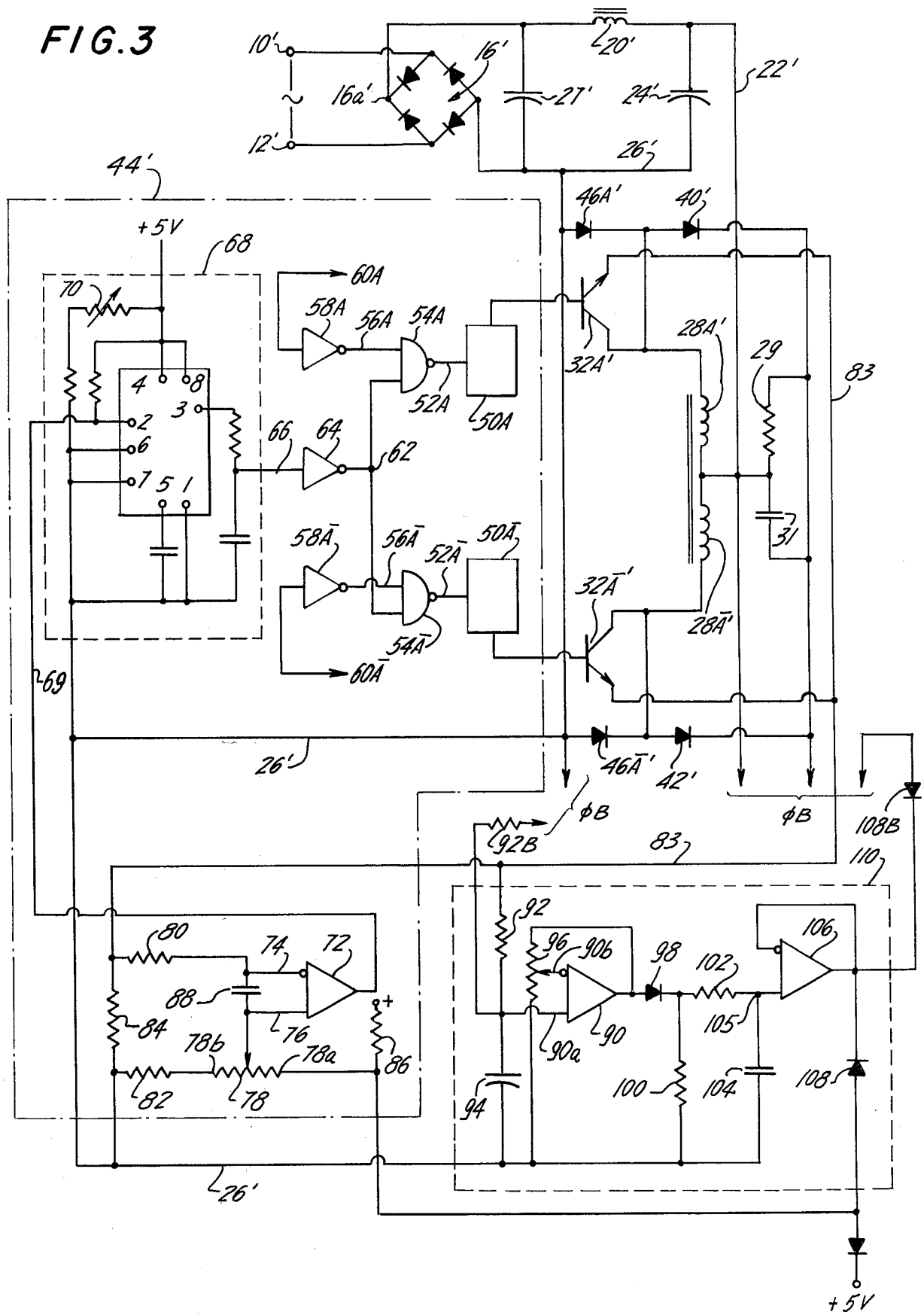
FIG. 3 is a wiring diagram of a stepping motor and a drive circuit as a further illustrative embodiment of various aspects of the invention.

FIG. 3 is an illustrative embodiment of certain features included in the apparatus of FIG. 1 plus other novel features. In FIG. 3, control circuit 44' includes chopper controls and is an adaptation of the control circuit in my U.S. Pat. No. 4,208,623.

The d-c power supply in FIG. 3 is the same in all respects as that in FIG. 1, corresponding elements bearing corresponding primed numerals. The values of choke 20' and capacitors 24' and 27' are the same here in FIGS. 1 and 3. This d-c power supply and its operation will be understood from the corresponding description of FIG. 1. Windings 28A' and 28$\overline{A}$' are energized under control of their respective switching transistors 32A' and 32$\overline{A}$', the bases of these switching transistors being connected to control circuit 44'. When switching transistor 32A' is closed, winding 28A' is connected from negative line 26' to positive line 22' of the d-c power supply. When switching transistor 32A' is turned off, the current in winding 28A' is interrupted and reverse current flows from line 26' through diode 48$\overline{A}$' and through winding 28$\overline{A}$' to line 22' of the d-c supply, building up the charge in capacitor 24'. Similarly, when transistor 32$\overline{A}$' is switched off so as to interrupt the energizing current in winding 28$\overline{A}$', reverse induced current flows from line 26' through diode 46A' and winding 28A' to line 22', providing a charging impulse to capacitor 24'.

As there is leakage inductance in the motor which could cause excessive voltages to occur across a switching device when it is opened, there is provided a suppression circuit which includes diodes 40' and 42' together with a resistor 29 and a capacitor 31 interconnected as shown.

A line driver amplifier 50A which may be a Fairchild type 9636 integrated circuit if desired or an equivalent series of discrete transistors is so arranged that a low voltage at lead 52A at the input to the line driver amplifier causes transistor 32A' to conduct while a high voltage effects non-conduction of transistor 32A'. The lead 52A is connected to the output of an open collector, type 7426, NAND gate 54A which receives on one input 56A a signal provided at the terminal 60A. A low voltage signal on the terminal 60A will produce, through a type 7414 Schmitt trigger inverter 58A, a high voltage on the input 56A which, if concurrent with a high voltage on the other input 62 of the gate 54A, will produce a low voltage on the lead 52A and cause conduction of the transistor 31.

The input 62 is connected to the output of an inverting Schmitt trigger-inverter 64 which receives a voltage signal on the lead 66 connected to the output of a monostable timer included within the block 68. The timer 68 is a type 555 connected in a conventional manner to produce a high output on the lead 66, the time being adjustable but being set essentially at 20 micro-seconds by the use of an adjustable resistor 70. Accordingly, each time the timer 68 is triggered, the lead 66 becomes high, which produces a low signal on the input 62 and even when concurrent with the high signal on the input 56A, produces a high signal on the lead 52A to cause the transistor 32A' to be rendered non-conducting.

The timer output then shifts to low until the next triggering signal is received, and during this low period, the lead 62 has a high voltage thereon which, when concurrent with a high voltage on the input 56A, shifts the transistor 32A' to its conducting state.

The triggering lead 69 is connected to the output of a comparator 72 which may be type LM 311 and it has one input 74 connected through a resistor 80 to the lead 83. Its other input 76 is connected to the tap of the adjustable resistor 78, which provides reference input to the comparator. One end 78a of potentiometer 78 is connected through resistor 86 to a positive voltage reference source while its other end 78b is connected to the negative terminal 26' through a resistor 82. A capacitor 88 is connected between the two inputs 74 and 76 of comparator 72, to bypass spurious pulses.

Resistor 84 has quite a low value, of the order of 0.1 ohms, and thus produces on the input 74 the small positive voltage across resistor 84 that is proportional to the value of the energizing current flowing through either winding. The other input 76 receives a reference voltage. When the two values are equal, the comparator 72 changes its output on the lead 69 from high to low which, in turn, produces a low voltage on the input 62 to cause the transistor 32A' to become non-conducting for the time fixed by the timer. Upon completion of that fixed time, the transistor 32A' is automatically rendered conducting and remains so until the next triggering signal is again applied on the lead 69. That occurs as a result of the energizing current rising to the value of the current that produces a voltage value on lead 74 equalling that appearing at the tap of potentiometer 78. The next triggering signal at 60A will result in the opening of transistor 32A' for the fixed time. The chopper circuit 44' will continue to repeat the on-off states of transistor 32A' at a rate that, at stand-still, is 20 kHz but which changes in accordance with the motor's requirements.

While the above description relates to winding 28A', the same description applies to the control of switching transistor 32$\overline{A}$' in energizing and deenergizing winding 28$\overline{A}$'. The description of that circuit and its operation will not be repeated inasmuch as it is readily understood from the description of the channel of components with "A" numerals. Notably, the emitters of both transistors 32Ā' and 32A' are connected by lead 83 to current-sensing resistor 84. Inasmuch as only one of these two switching transistors is conducting at any one time, resistor 84 senses current of only one winding 28A' or 28A' at any one time.

Since the current in each phase winding produces a voltage drop across sensing resistor 84, the voltage on connection 83 represents the phase current. That voltage is applied to one input 90a of an inverting operational amplifier 90. A series resistor 92 an a shunt capacitor 94 provide a spike filter for the input terminal 90a. The other input 90b of operational amplifier 90 is connected to potentiometer 96 which, in turn, has one terminal connected to bus 26' of the d-c power supply and its opposite terminal connected to the output of differential amplifier 90. The gain of this amplifier is set at about 20, for example.

Diode 98 and resistor 100 constitute a peak detector for the output signals from resistor 84, amplified in operational amplifier 90. Series resistor 102 and shunt capacitor 104 integrate the output of peak detector 98–100, resistors 100 and 102 providing a slow discharge path for the charge built up in integrating capacitor 104.

Junction 105 of resistor 102 and capacitor 104 forms one input to unity-gain isolating amplifier 106. That output is coupled via isolating diode 108 to the terminal 78a of potentiometer 78.

As the voltage across sensing resistor 84 rises and falls instantly with the energizing current in each phase winding 28A' and 28Ā', that voltage, amplified, is stored in capacitor 104 and applied to terminal 78a as a reference signal. For example, a 0.5 V signal developed across resistor 84 will appear at the output of amplifier 90 and across capacitor 104 as a 10 V signal.

The R-C circuit 100-102-104 has a longer time constant than the period of the lowest-frequency oscillation that is to be suppressed. During the interval of any one current pulse, the voltage at junction 105 will change a little with the changing levels of phase current over a series of pulses. However, because resistors 100 and 102 limit the decrease that can develop during a pulse period in the voltage to which capacitor 104 is charged, only gradual change in the voltage at junction 105 can occur. That is applied as a voltage reference at terminal 78a, representing a floating current reference. Bias resistor 86 and blocking diode 108 maintain a minimum voltage reference at terminal 78a.

The overall operation may now be reviewed. One of the switching transistors 32A' and 32Ā' is conditioned to be conducting or "selected" (subject to output of the chopper at lead 62) by phase sequencing input from leads 60A and 60Ā to gates 54A and 54Ā. When the chopper circuit enables the selected switching transistor, a pulse of current rises in phase winding 28A' or 28Ā' at a rate largely limited by its inductance. When the current in the phase winding which also flows through sensing resistor 84 rises to the point where input 74 of comparator 72 exceeds the voltage at input 76, the output of the comparator reverses and causes the chopper to open the selected transistor for the "off" time of the chopper circuit. During that time, the magnetization produced theretofore is sustained by the induced current in the other winding of that phase.

When the phase current stopped (the start of the chopper "off" time) comparator 72 again provided enabling input to the chopper. Therefore, at the end of the "off" time, the chopper again causes the selected switching transistor to close.

Controlling input to lead 76 of comparator 72 is partially determined by the bias provided through resistor 86, to establish a desired minimum phase current, all as set forth in pending U.S. application Ser. No. 909,590. However, at most times the output at junction 105 of the R-C time-constant circuit provides a varying reference that dominates. That reference varies gradually with the input to amplifier 90 from current-sensing resistor 84. Consequently, the circuit in the dotted rectangle 110 which provides the floating current reference together with the circuit of comparator 72 constitute a floating current clamp. This clamp is allowed to float at a rate too slow to sustain parametric oscillation of lowest frequency.

The above description and most of FIG. 3 relate to energization of the windings of phase A but another chopper, duplicating chopper 44', should be added for phase B. The same floating current reference 110 may be used in common for phases A and B, using another input resistor 92B and another blocking diode 108B at the output. The same d-c power supply including choke 20' and capacitor 24' can also serve the chopper and windings of phase B.

The positive damping provided by the floating current clamp and the chopper is complemented by the positive damping imparted by choke 20' and capacitor 24' in the d-c power supply. Two chopper controllers 44' and current reference 110 serve phases A and B. While the chopper and floating current clamp of FIG. 3 produces prominent positive damping with related improvement of torque in the regions where oscillation tends to occur, the high impedance d-c power supply complements that effect.

In the embodiment of FIG. 1, the chokes 36 and 38 with their shunting diodes have a long time constant compared with the period of the slowest parametric oscillation. Thus, each choke 36 and 38 in an example has a reactance of 30 mH and the resistance in the choke-diode loop is about 0.3 ohms. Its decay time constant is about 100 milliseconds.

In the embodiment of FIG. 3, where resistor 100 may be 470 K ohms, resistor 102 may be 10 K ohms and capacitor 104 may be 0.1 Mfd., for example, the discharge time constant is 47 milliseconds.

These examples evidence much longer discharge time constants than the longest period of parametric oscillation that is to be suppressed in the operation of most stepping motors, typically 50 to 100 Hz, corresponding to a period of 10 to 5 milliseconds.

The foregoing description of two illustrative embodiments of the various aspects of the invention may be modified and variously applied by those skilled in the art. For example, the choppers in control circuit 44 of FIG. 1 may be omitted. Further, a series choke and shunt capacitor in the a-c leads to the bridge rectifier may be added to FIG. 1 as shown in my U.S. Pat. No. 3,505,579, assigned to the assignee hereof, for increasing the output voltage of the power supply with increasing stepping rates. Therefore, the invention should be construed broadly in accordance with its true spirit and scope.

What is claimed is:

1. The combination of a stepping motor having plural phase windings, energizing means for supplying unidirectional current to said phase windings, switching means for sequentially connecting the phase windings to and disconnecting them from the energizing means for causing stepwise operation of the motor, and current-clamping means for regulating the current of said windings, said current clamping means including means responsive gradually to the energization of said windings for establishing a variable level of current limitation, for thereby developing significant positive damping of parametric motor oscillations.

2. The combination as in claim 1, including series inductance means in the output of said energizing means to said phase windings, said series inductance means having a reactance of at least approximately three times the reactance of the energized phase windings, and means providing shunt capacitance at the output of said series inductance means, the value of said capacitance being limited for developing substantial positive damping of parametric oscillation of the motor.

3. The combination as in claim 1 including current-chopping means for interrupting the connection of said windings to said energizing means repeatedly within each step of the motor at least at low stepping speeds.

4. The combination as in claim 2 including current-chopping means for interrupting the connection of said windings to said energizing means repeatedly within each step of the motor at least at low stepping speeds.

5. The combination as in any of claims 1, 2, 3 and 4 wherein the means for establishing the gradually variable level of current limitation has a time constant substantially longer than the longest period of parametric oscillation to be damped.

6. The combination as in any of claims 1, 2, 3 and 4 wherein the means for establishing a level of current limitation is arranged to inhibit increase of the current supplied to the windings above the current-limitation level in effect at any moment, said establishing means being adapted to accommodate decline of said level during periods of reduced current drawn by the motor but at a rate of decline slower than changes in motor current tending to occur during parametric oscillation of motors having drives lacking such current clamping means.

7. The combination as in any of claims 1, 2, 3 and 4 wherein said current-clamping means includes means for sensing pulses of energizing current to said phase windings, means for providing a signal representing a resolution of a succession of said pulses of energizing current, and means regulated by said signal representing means for inhibiting the rise of each new pulse of energizing current.

8. The combination as in claim 7 wherein said signal-representing means has a time constant that is substantially longer than the longest period of motor oscillation to be damped.

9. The combination as in any of claims 1, 2, 3 and 4 wherein said current-clamping means comprises an inductor in series with each said phase winding when energized and a rectifier shunting each said inductor and polarized for conduction in the direction opposite to the flow of unidirectional current from said energizing means to the related phase winding.

10. The combination as in claim 9 wherein each said inductor has a reactance of approximately 15 to 60 times the reactance of its related phase winding.

11. The combination of a stepping motor having plural phase windings, energizing means for supplying unidirectional current to said phase windings, switching means for sequentially connecting the phase windings to and disconnecting them from the energizing means for causing stepwise operation of the motor, and series inductance means in the output of said energizing means to said phase windings, said series inductance means having a reactance of at least approximately three times the reactance of the energized phase windings, and means providing shunt capacitance at the output of said series inductance means, the value of said capacitance being limited for developing substantial positive damping of parametric oscillation of the motor.

12. The combination as in claim 11 wherein said capacitance is approximately 300 Mfd.

13. The method of providing positive damping in a stepping motor and its drive having a unidirectional current power supply, the motor and its drive being susceptible to oscillation and loss of torque at least at a mid-range stepping frequency, including the steps of periodically providing current pulses from said power supply to said motor, sensing said pulses and storing a variable current reference representing a resolved value of many of such sensed pulses, and restraining the rise of each succeeding pulse of motor current in accordance with the stored current reference.

14. The method as in claim 13, wherein the stored current representation is allowed to vary in dependence on the motor need but only over a longer period than that of said oscillation.

* * * * *